US007667989B2

(12) United States Patent
Liu

(10) Patent No.: US 7,667,989 B2
(45) Date of Patent: Feb. 23, 2010

(54) METHOD FOR CONTROLLING START TIME SERIES BY STAGES

(75) Inventor: Che-Chia Liu, Taipei Hsien (TW)

(73) Assignee: Andyson International Co., Ltd., Taipei Hsien (TW)

( * ) Notice: Subject to any disclaimer, the term of this patent is extended or adjusted under 35 U.S.C. 154(b) by 281 days.

(21) Appl. No.: 11/976,869

(22) Filed: Oct. 29, 2007

(65) Prior Publication Data
US 2009/0108819 A1    Apr. 30, 2009

(51) Int. Cl.
*H02M 7/10* (2006.01)
*G05F 1/10* (2006.01)

(52) U.S. Cl. ........................................ 363/49; 323/238
(58) Field of Classification Search ................... 363/49; 323/238, 266, 267, 284, 901, 908
See application file for complete search history.

(56) References Cited

U.S. PATENT DOCUMENTS

| | | | | |
|---|---|---|---|---|
| 4,697,229 A | * | 9/1987 | Davy et al. | 363/49 |
| 5,267,135 A | * | 11/1993 | Tezuka et al. | 363/49 |
| 5,689,407 A | * | 11/1997 | Marinus et al. | 363/49 |
| 5,861,737 A | * | 1/1999 | Goerke et al. | 323/238 |

\* cited by examiner

*Primary Examiner*—Jessica Han
(74) *Attorney, Agent, or Firm*—Muncy, Geissler, Olds & Lowe, PLLC

(57) ABSTRACT

A method for controlling start time series by stages adopted for use on a power supply consisting of a main power system and a standby power system. The power supply includes an energy storage unit to store a judgment power. The method mainly includes: setting a start voltage, setting a boosted voltage, getting a judgment power voltage and detecting whether the judgment power has reached the start voltage or the boosted voltage, and alternately starting the standby power system and the main power system. Thus the main power system and the standby power system are started at different time series. In terms of the energy storage unit the load increases by stages. Therefore the energy storage unit can be charged to increase the judgment power voltage and increase loading by stages. As a result, inrush current also rises by stages and can be harnessed as desired.

14 Claims, 6 Drawing Sheets

METHOD FOR CONTROLLING START TIME SERIES BY STAGES

FIELD OF THE INVENTION

The present invention relates to a method to control start by stages and particularly to a method to control start time series of a power supply.

BACKGROUND OF THE INVENTION

A conventional power supply includes at least a main power system, a standby power system, a transformer and a conversion output unit at the secondary side of the transformer. The main power system and the standby power system have respectively a large capacitor to adjust energy output and storing. When the power supply is started it performs charging rapidly and at the same time provides sufficient power output to the main power system and the standby power system. However, the voltage of the capacitor rises according to an exponential curve. Hence after the power supply starts there is a charging period in which the capacitor does not reach the voltage level of system regular operating condition. Based on the formula P=V×I (Power=Voltage× Current), when the power supply starts initially the capacitor is not yet being charged, the voltage is low but the secondary side of the transformer has already supplied full load output power. Hence current is very high, and an inrush current occurs as shown in FIG. 1. Such a condition likes short circuit. If the power supply starts at the peak voltage value of input AC potential the phenomenon of inrush current is even more serious. To suppress the inrush current a conventional approach employs a thermal resistor of a negative temperature coefficient (or NTC in short) to provide a greater resistance at the start time to harness the current. The thermal resistor has its resistance gradually decreased as the temperature increases while the power supply is in duty. Hence impact to the regular operating current can be reduced. But at a regular room temperature if the resistance of the thermal resistor is too high or the temperature is too low the resistance rises excessively, the power supply cannot be started normally. In the regular room temperature the resistance is too low and the efficacy of suppressing the inrush current is not desirable. Moreover, the thermal resistor continuously consumes power and generates heat during regular operation of the power supply. As a result total efficiency of the product decreases. And the unnecessary heat also affects product life span. Although the power supply usually has a relay to short circuit the thermal resistor during regular operation, adding the relay increases the cost. Thus such a practice also has its share of disadvantage.

SUMMARY OF THE INVENTION

In view of the negative impact on the power supply resulting from the inrush current and the disadvantages occurred to the conventional approach for suppressing the inrush current, the object of the present invention is to provide a method to prevent damage of the power supply caused by inrush current at a minimum cost.

The present invention provides a method to control start time series by stages to be used on a power supply which includes a main power system and a standby power system. The power supply also has an energy storage unit chargeable to store a judgment power. The method of the invention includes: setting a start voltage of the standby power system, setting a boosted voltage for the main power system, getting a judgment power, determining a start measure of the standby power system, and determining another start measure of the main power system. A circuit is provided to implement the method of the invention. The circuit includes a detection/activation unit used in the conventional power supply to inspect whether the voltage level of the judgment power has reached the start voltage level and determine whether to start the standby power system. After the standby power system has started, determine whether to start the main power system depending on whether the judgment power has reached the boosted voltage level. Hence the main power system and the standby power system are started at different time series. In terms of the energy storage unit such an approach substantially increases the load by stages. Hence the energy storage unit can be charged to boost the judgment power voltage by stages to increase loading. As a result the inrush current also rises by stages and can be harnessed as desired.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
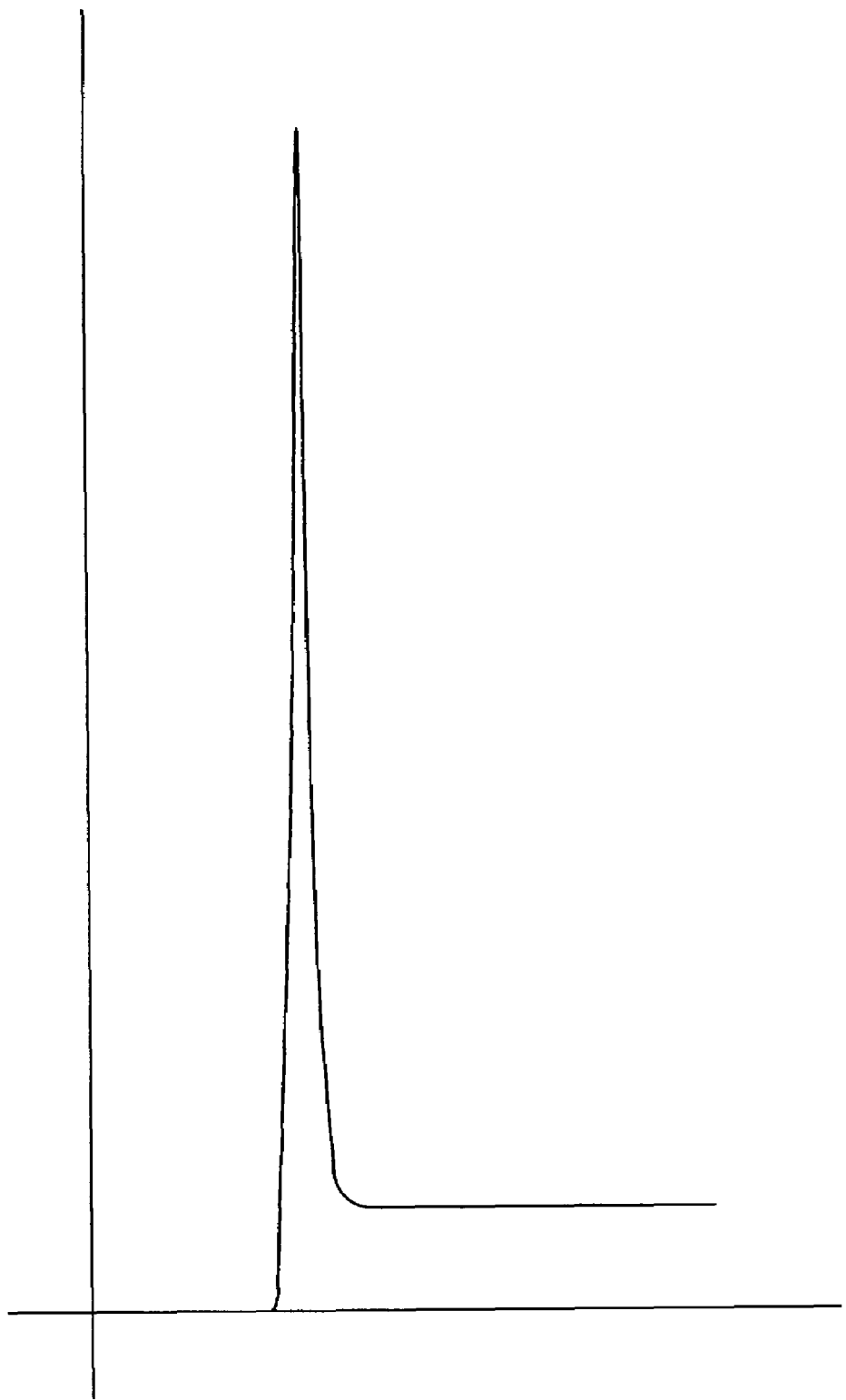
FIG. 1 is a waveform chart of a conventional inrush current.
Figure 2:
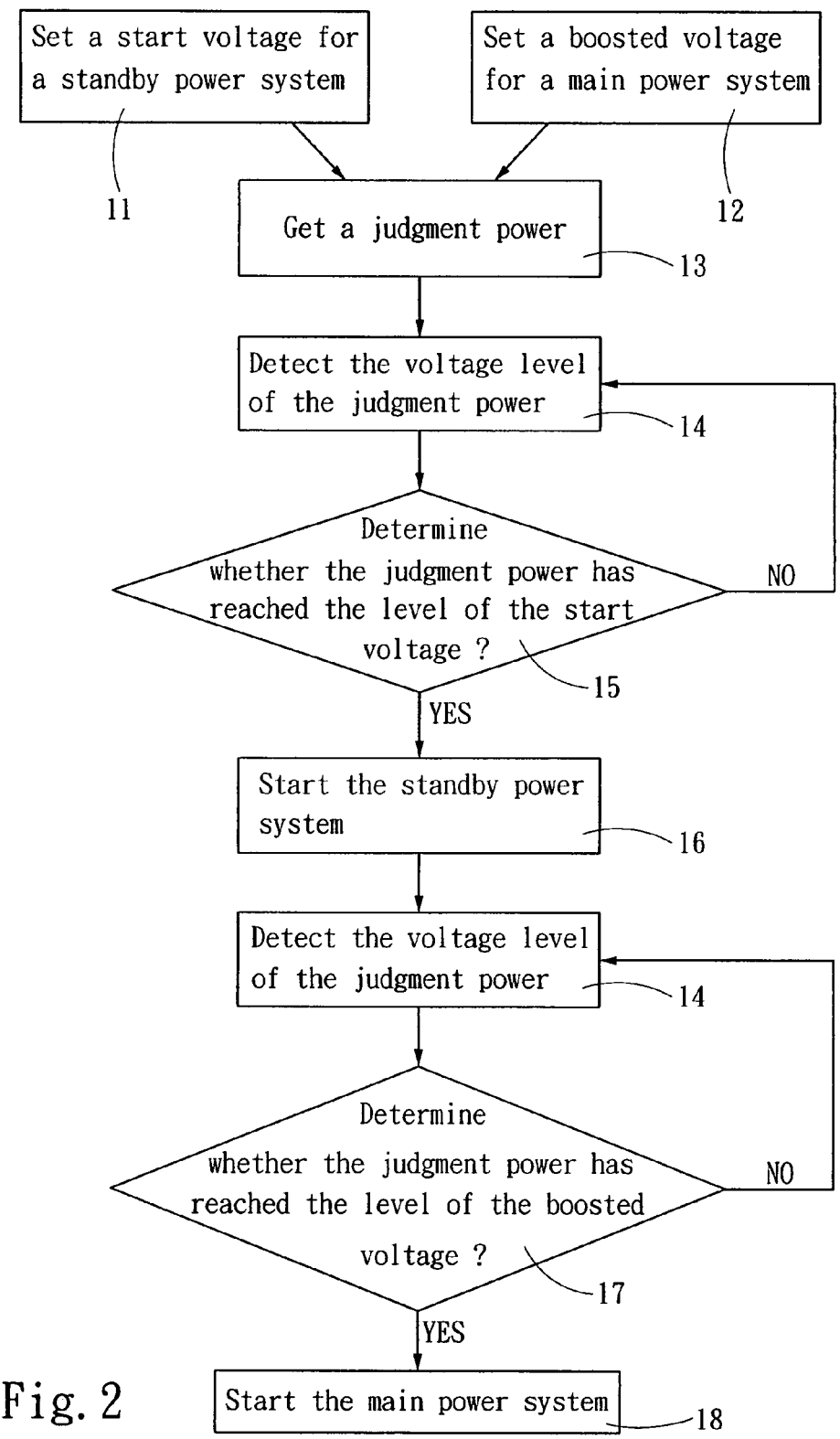
FIG. 2 is an implementation flowchart of the method of the invention.

The present invention provides a method to control start time series by stages to be used on a power supply 3 which includes a main power system 31 and a standby power system 32. The power supply 3 also has an energy storage unit 33 connecting to a power source 2 to receive input power and store energy to become a judgment power. To avoid the voltage of the judgment power too low such that start of the main power system 31 and the standby power system 32 generates inrush current, the invention controls the main power system 31 and the standby power system 32 to start at different time series so that the inrush current is harnessed without rising too high at once. The method of the invention includes: A. setting a start voltage for the standby power system; B. setting a boosted voltage for the main power system; C. getting a judgment power; D. determining a start measure of the standby power system, and E. determining another start measure of the main power system. By setting a start voltage and a boosted voltage, when the judgment power has reached the voltage level of the start voltage, the standby power system is started to output standby power. Otherwise return to the preceding step to continuously detect the voltage of the judgment power. In the event that the judgment power continuously rises and reaches the boosted voltage, the main power system is started. The step D may further include a delay output measure to make the started standby power system to output the standby power to the main power system after a delay time period. The step E may further include a plurality of conversion output units in the main power system to be started alternately. Refer to FIG. 2 for the flowchart to implement the steps set forth above. First, set a start voltage (11) of the standby power system and a boosted voltage (12) of the main power system; receive a judgment power (13); detect the voltage level of the judgment power (14); determine whether the judgment power has reached the level of the start voltage (15); if the judgment power does not reach the level of the start power, return to the preceding step to continuously detect the voltage of the judgment power; when the judgment power has reached the start voltage level the standby power system is started (16); detect the voltage level of the judgment power (14) and determine whether the judgment power has reached the level of the boosted voltage (17); when it is determined that the judgment power has reached the boosted voltage level the main power system is started (18); the power supply is fully started and outputs normally. By means of the aforesaid steps the main power system and the standby power system can be started by stages while the energy storage unit is being charged. Namely, after the energy storage unit has been charged for a selected time period, its power output increases. According to the formula P=VI, when the voltage (V) of the energy storage unit has risen to a selected stage, the main power system or the standby system outputs a constant power (P) to reduce the amount of current (I). Thereby inrush current can be suppressed.

Figure 3:
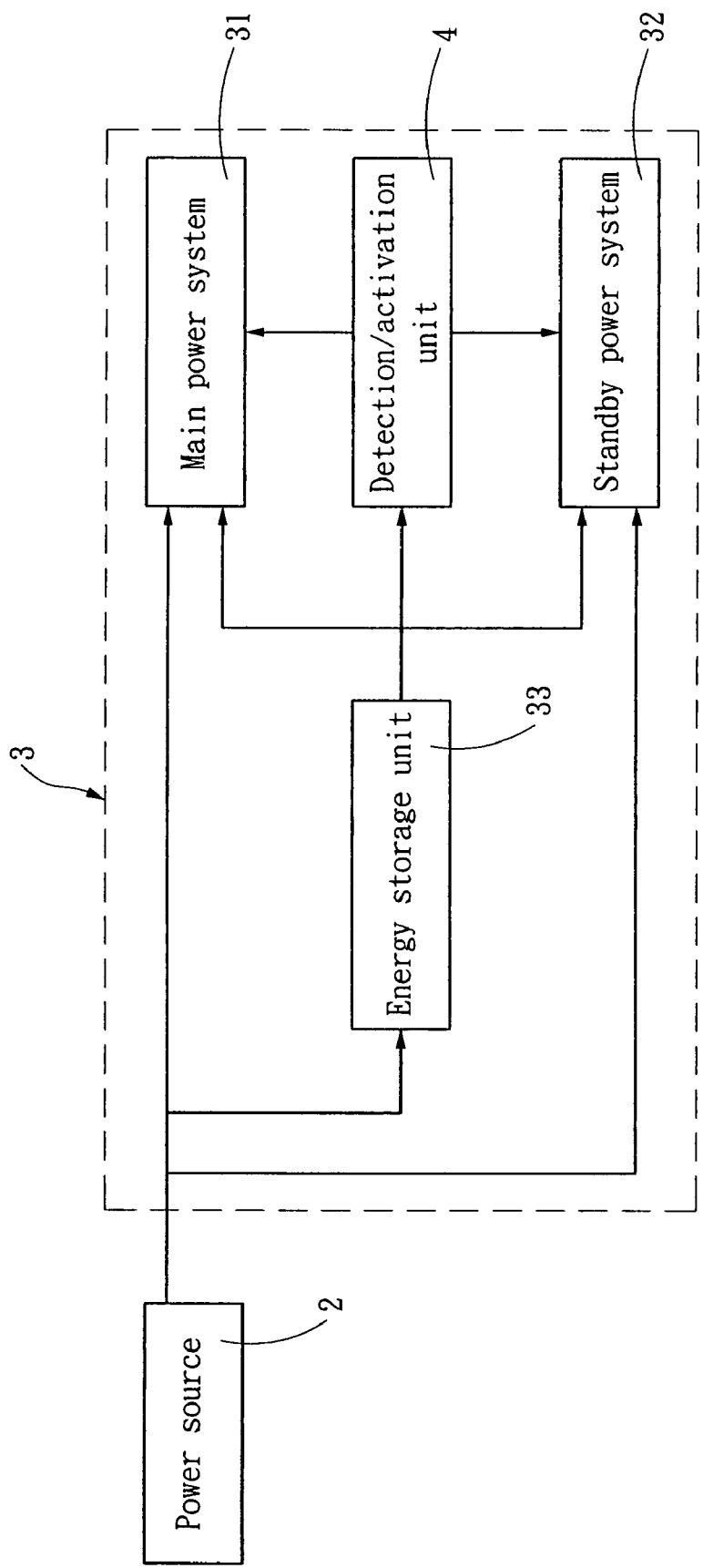
FIG. 3 is a circuit block diagram of an embodiment of the invention.
Figure 4:
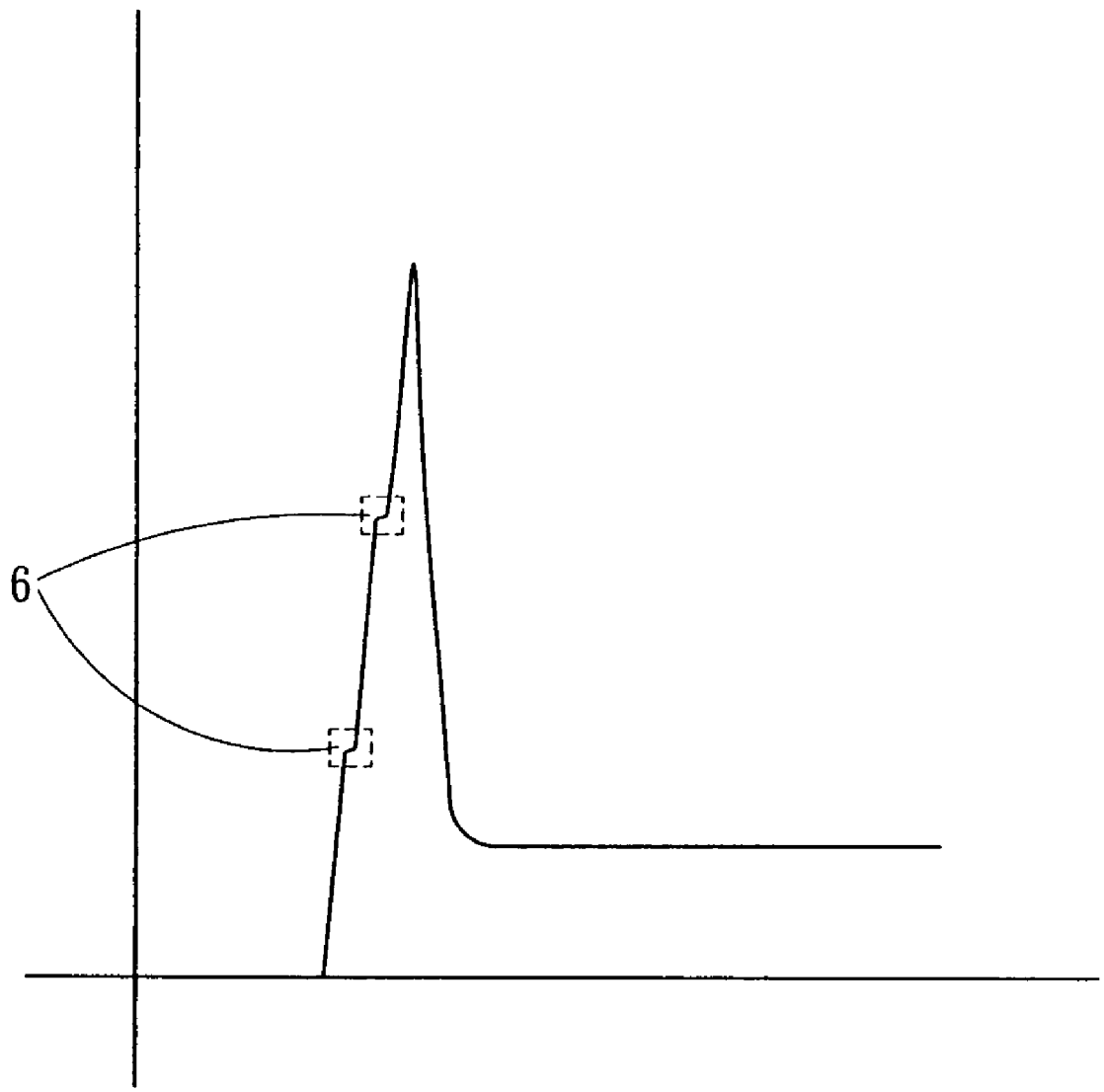
FIG. 4 is a waveform chart with improved inrush current.

Refer to FIG. 3 for a circuit architecture of an embodiment to implement the method previously discussed. The power supply 3 includes a main power system 31, a standby power system 32 and an energy storage unit 33. The power supply 3 is connected to a power source 2 to receive input power. The energy storage unit 33 receives the input power and is charged to maintain a judgment power to adjust and maintain steady output of the main power system 31 and the standby power system 32. The power supply 3 further has a detection/activation unit 4 to preset the start voltage and boosted voltage, and control start time series of the main power system 31 and the standby power system 32. The detection/activation unit 4 receives the judgment power and inspects whether the judgment power has reached the level of the start voltage and boosted voltage, then determines the start time series of the standby power system 32 and the main power system 31. When the energy storage unit 33 receives the input power and is charged, the judgment power rises continuously until reaching the start voltage, then the detection/activation unit 4 orders the standby power system 32 to start. After the standby power system 32 has been started, the judgment power rises continuously until reaching the boosted voltage level, then the main power system 31 is started. Thus start by stages is accomplished, and inrush current can be suppressed. The start current waveform of the power supply 3 is shown in FIG. 4. There is at least one zigzag section 6 to provide sufficient buffer time for the energy storage unit 33 to be charged to the regular duty voltage. As a result the start current according to the invention is far lower than the conventional inrush current.

Figure 5:
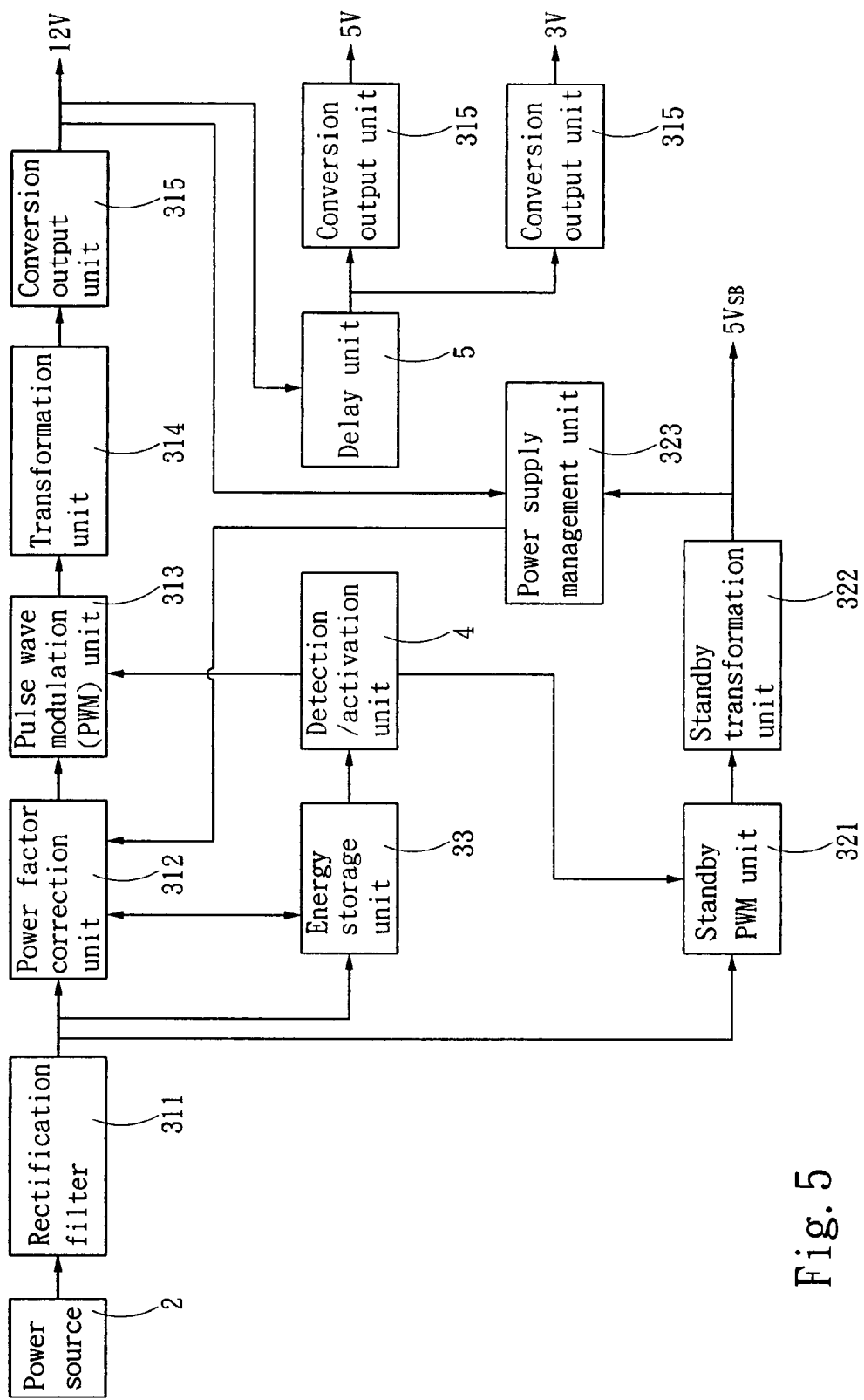
FIG. 5 is another circuit block diagram of an embodiment of the invention.
Figure 6:
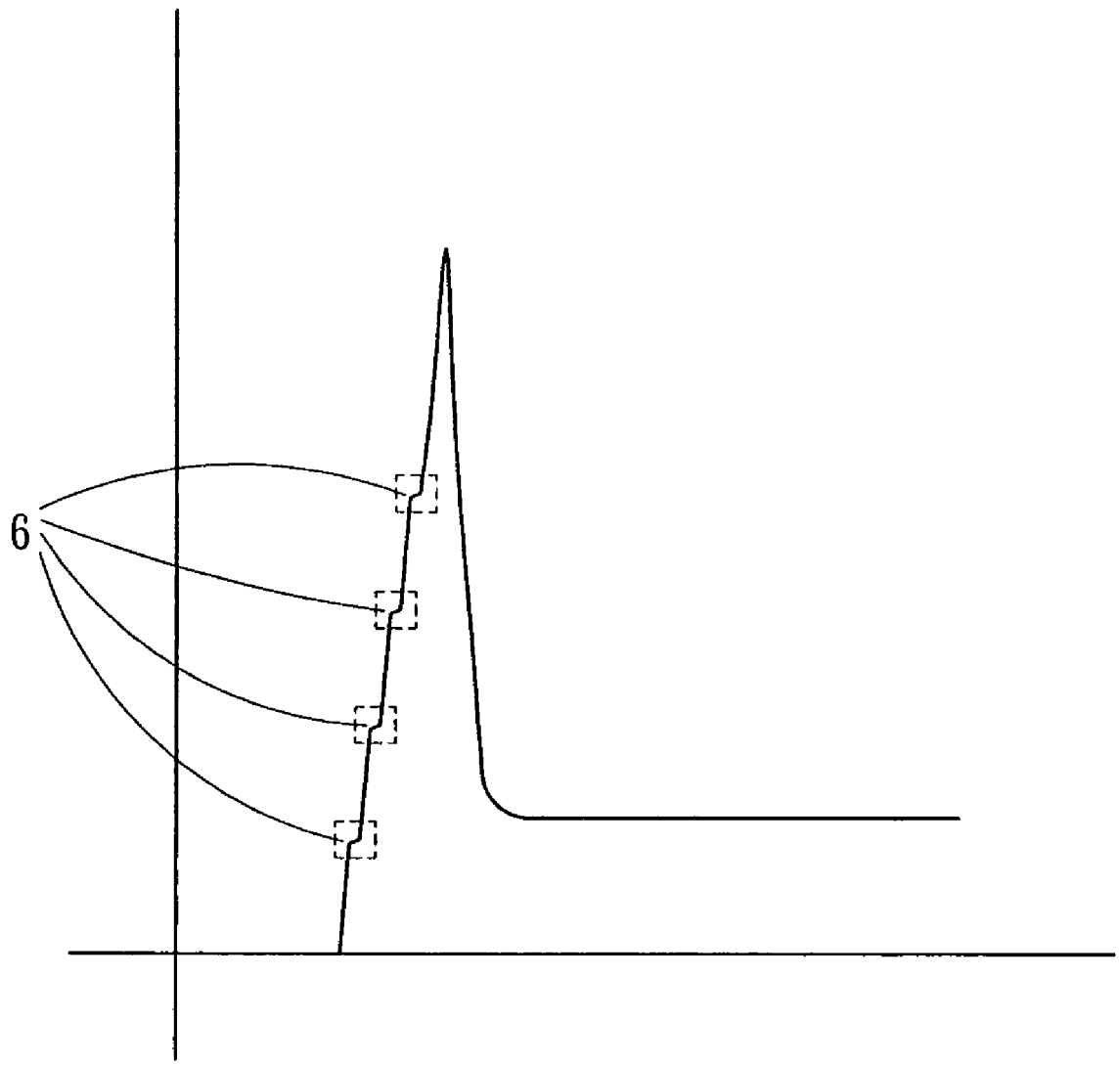
FIG. 6 is another waveform chart with improved inrush current.

Refer to FIG. 5 for a detailed structure of the power supply 3. The main power system 31 further includes a power factor correction unit 312, a pulse wave modulation (PWM) unit 313, a transformation unit 314 and a plurality of conversion output units 315. The standby power system 32 includes a standby PWM unit 321, a standby transformation unit 322 and a power supply management unit 323. The power supply 3 is connected to a power source 2 to receive input power, and through a rectification filter 311 to perform rectification and transfer to the power factor correction unit 312 and the standby power system 32. The energy storage unit 33 is connected to the rectification filter 311 to receive power for charging to form a judgment power. The detection/activation unit 4 detects the voltage level of the judgment power. When the judgment power reaches a start voltage level preset by the detection/activation unit 4 the standby PWM unit 321 is activated so that the standby PWM unit 321 generates a second cycle signal to regulate the amount of standby power output from the standby transformation unit 322. The standby power system 32 further has the power supply management system 323 to monitor output conditions of various systems. The power supply management unit 323 receives the standby power and delays a preset output delay time to convert and send the standby power to the power factor correction unit 312 and activate the power factor correction unit 312 to start operation. The power factor correction unit 312 raises the voltage of the judgment power of the energy storage unit 33. If the judgment power of the energy storage unit 33 reaches the level of the boosted voltage the detection/activation unit 4 activates the PWM unit 313 of the main power system 31. The PWM unit 313 generates a first cycle signal to regulate output of the transformation unit 314 that is output through the conversion output units 315. Moreover, the conversion output units 315 further may be connected to a delay unit 5 to make every conversion output unit 315 to go through a delay time period to start and output alternately. Or the delay unit 5 sets different delay time periods to make every conversion output unit 315 to go through a different delay time period to start and output alternately. The PWM unit 313 generates a soft start cycle signal to the transformation unit 314 to soft start the transformation unit 314. Soft start is a technique known in the art, thus the details are omitted herein. Through the processes and control circuits set forth above, the main power system 31 and the standby power system 32 can be started and output at different time series. And the conversion output units 315 of the main power system 31 can further be started and output by stages according the delay time period. The input current waveform of the power supply 3 is shown in FIG. 6. Through the approach of start by stages of the power supply 3 a plurality of zigzag sections 6 can be formed on the start current waveform. Thus inrush current can be suppressed. And a buffer time is provided to charge the energy storage unit 33 and reduce the peak value of the start current.

The power supply 3 may have one energy storage unit 33, or two energy storage units 33 located respectively in the main power system 31 and the standby power system 32. The energy storage unit 33 may also be a capacitor, but this is not the limitation.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. A method for controlling start time series by stages adopted for use on a power supply consisting of a main power system and a standby power system, comprising the steps of:
   A. setting a start voltage for the standby power system;
   B. setting a boosted voltage for the main power system;
   C. getting a judgment power by connecting to a power source to receive input power and store energy;
   D. determining start of the standby power system when the judgment power has reached the voltage level of the start voltage to output a standby power, otherwise returning to the preceding step; and
   E. determining start of the main power system when the judgment power has stored energy and reached the voltage level of the boosted voltage such that the main power system is started for operation and delivering output, otherwise continuing detection.

2. The method of claim 1, wherein the step D further includes delaying the output to make the started standby power system to delay for an output delay time period to deliver the standby power to the main power system.

3. The method of claim 2, wherein the main power system includes a pulse wave modulation (PWM) unit to generate a first cycle signal, a transformation unit to receive the first cycle signal and transform power and a plurality of conversion output units at a rear end of the transformation unit, and the standby power system includes a standby PWM unit to generate a second cycle signal, a standby transformation unit controlled by the second cycle signal to regulate output and a power supply management unit to generate the output delay time period, and a detection/activation unit to detect the judgment power and determine start time of the PWM unit and the standby PWM unit.

4. The method of claim 3, wherein the step E further includes alternately starting the conversion output units.

5. The method of claim 4, wherein each of the conversion units goes through a delay time period to start and output.

6. The method of claim 4, wherein each of the conversion units goes through a different delay time period to start and output.

7. The method of claim 4, wherein the step of alternately starting the conversion output units is accomplished by connecting the conversion output units of the main power system to a delay unit.

8. The method of claim 3, wherein the PWM unit generates a soft start cycle signal to the transformation unit.

9. The method of claim 3, wherein the conversion output units output different voltage values.

10. The method of claim 1, wherein the judgment power is formed by charging the input power to an energy storage unit.

11. The method of claim 10, wherein the energy storage unit is a capacitor.

12. The method of claim 1, wherein the judgment power is formed by charging the input power to two energy storage units.

13. The method of claim 12, wherein the two energy storage units are located respectively in the standby power system and the main power system.

14. The method of claim 12, wherein the energy storage units are capacitors.

* * * * *